INVENTORS
RICHARD F. WIGGINS
JOHN A. MALTAS
FREDERICK E. ULLMAN
BY
ATTORNEY

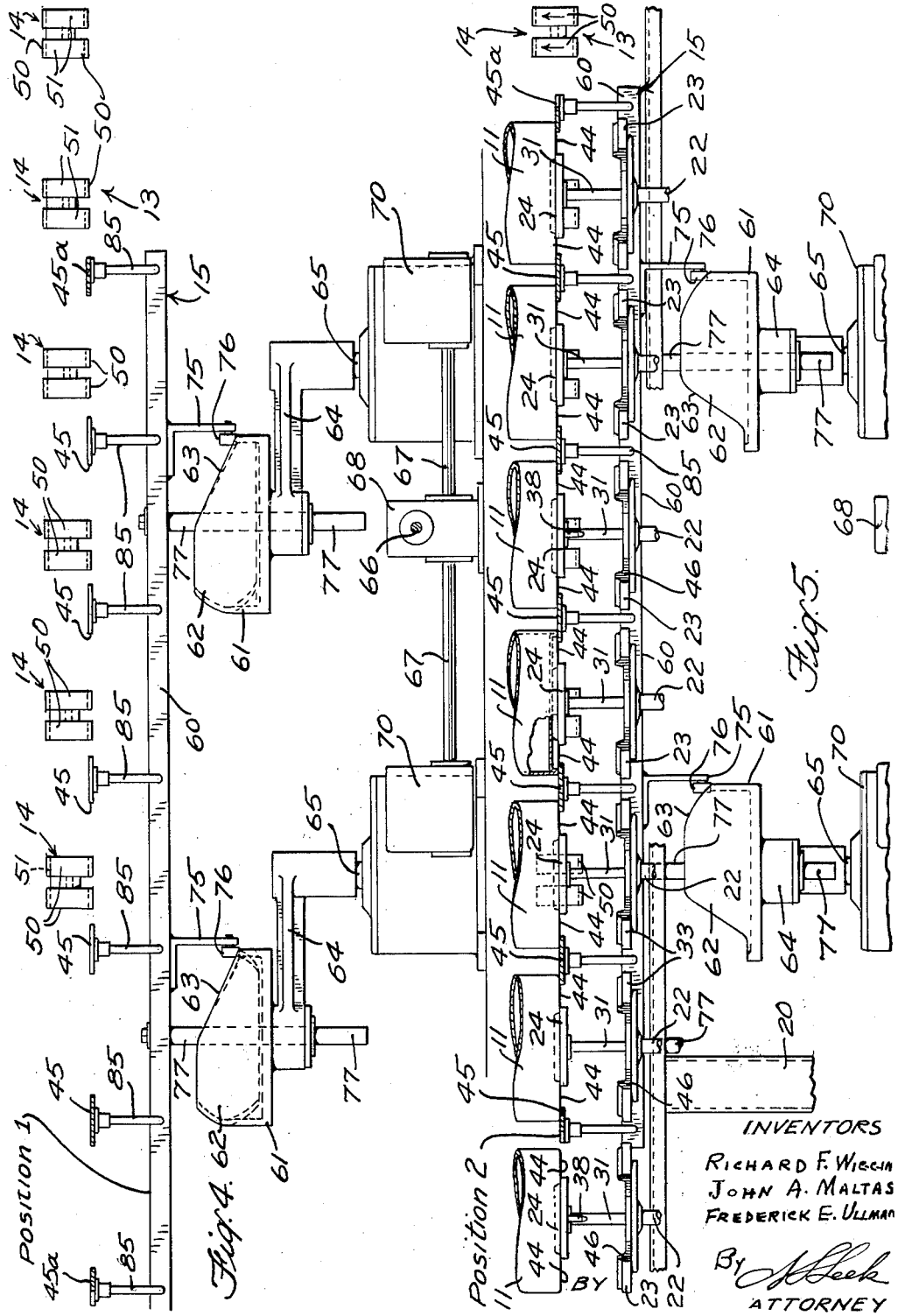

INVENTORS
RICHARD F. WIGGINS
JOHN A. MALTAS
FREDERICK E ULLMAN

BY
ATTORNEY

Jan. 16, 1962 R. F. WIGGINS ETAL 3,017,010
APPARATUS FOR TRANSFERRING OBJECTS BETWEEN CONVEYORS
Filed Aug. 2, 1960 7 Sheets-Sheet 6
Fig. 8.
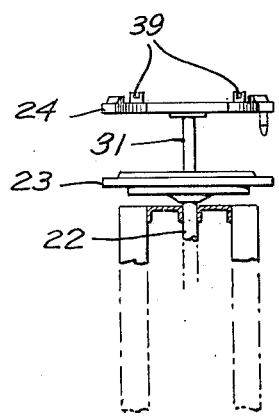
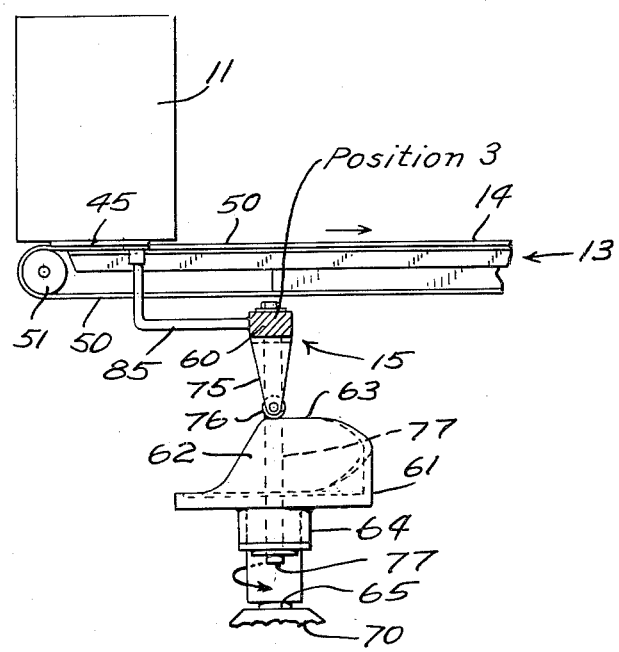
Fig. 9.
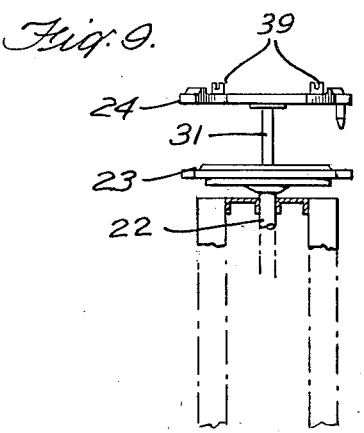
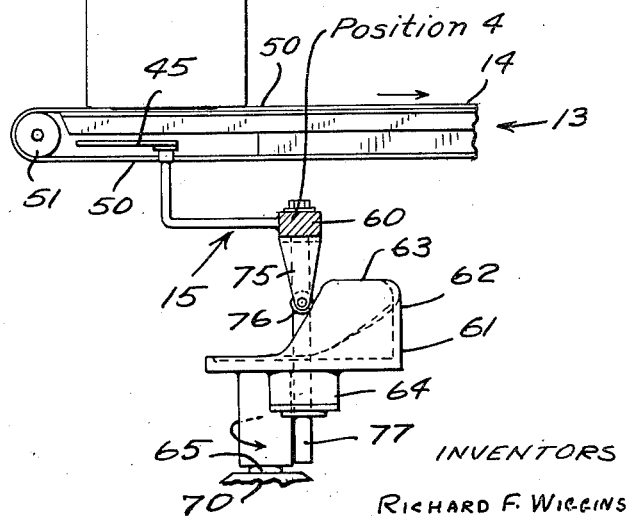
INVENTORS
RICHARD F. WIGGINS
JOHN A. MALTAS
FREDERICK E. ULLMAN
BY
ATTORNEY

United States Patent Office 3,017,010
Patented Jan. 16, 1962

3,017,010
APPARATUS FOR TRANSFERRING OBJECTS BETWEEN CONVEYORS
Richard F. Wiggins, Southport, and John A. Maltas, Bridgeport, Conn., and Frederick E. Ullman, Winnetka, Ill., assignors to The Gyromat Corporation, Fairfield, Conn., a corporation of Connecticut
Filed Aug. 2, 1960, Ser. No. 47,087
6 Claims. (Cl. 198—31)

The present invention relates to an apparatus for transferring objects between conveyors and for arranging said objects from single file on one conveyor to successive rows or ranks on the other.

During certain operations on objects in transit, it may be required to move the objects in single file, and during subsequent operations, it may be desirable to arrange and advance these objects in successive ranks or rows. For example, the containers would be moved in single file through the field of action of a spraying or coating mechanism, because the mechanism requires this formation of the objects for effective spray coverage. However it might be desirable to cut down the length of the conveyor path beyond the spraying mechanism, while the containers are being conveyed towards and through the baking or drying oven. For that purpose, it would be advantageous to arrange the containers in successive rows or ranks for movement in this form toward and through the drying oven.

In a more specific illustration of the utility of the present invention, open top containers after they have been internally coated or painted, as for example, with a coating composition containing a thermoplastic material, would be conveyed in a single file through the field of action of a spraying or coating mechanism, while in inverted position with their open ends down, to coat the outside of these containers. On their way to the baking or drying oven, it would be desirable to turn these containers over, so that the rims of these containers will not rest on the conveyor while being transported thereby through the drying oven, and will not be marred by the softening action of this oven. For that purpose, it is advantageous to arrange the containers in successive rows or ranks before entering the drying oven to permit the containers of each row to be turned over simultaneously, and the rows of containers to be turned over in succession as these rows move past a turnover station on their way to the drying oven. The arrangement of the containers in successive rows for that purpose, simplifies the turnover operation and at the same time cuts down the conveyor length.

One object of the present invention is to provide a new and improved mechanism for transferring objects from one conveyor to another and for simultaneously forming objects into rank from file.

Other objects and advantages of the invention are apparent from the following description and from the accompanying drawings, in which:

FIG. 1 is a top plan view of a mechanism by which objects moving in single file on one conveyor system are transferred to another conveyor system for movement thereon in successive ranks or rows, said mechanism being shown in full lines at an initial stage while said mechanism is moving into position to pick up a file of objects on one conveyor for transfer as a rank on the other conveyor and being shown in dot and dash lines at a subsequent stage when the objects are being deposited on said other conveyor;

FIG. 4 is a section of the transfer mechanism taken on lines 4—4 of FIG. 1 and shown at the same initial stage;

FIG. 5 is a section of the transfer mechanism taken on lines 5—5 of FIG. 2 and shown at the same later stage while the objects are being picked up from one conveyor in single file for transfer to the other conveyor in rank formation;

FIG. 8 is a section of the transfer mechanism similar to that shown in FIG. 6, except that the mechanism is shown at a stage later than that shown in FIG. 7 and corresponding to that shown in dot and dash lines in FIG. 1 in which the objects transferred from one conveyor are about to be deposited on the other conveyor;

Figure 2:
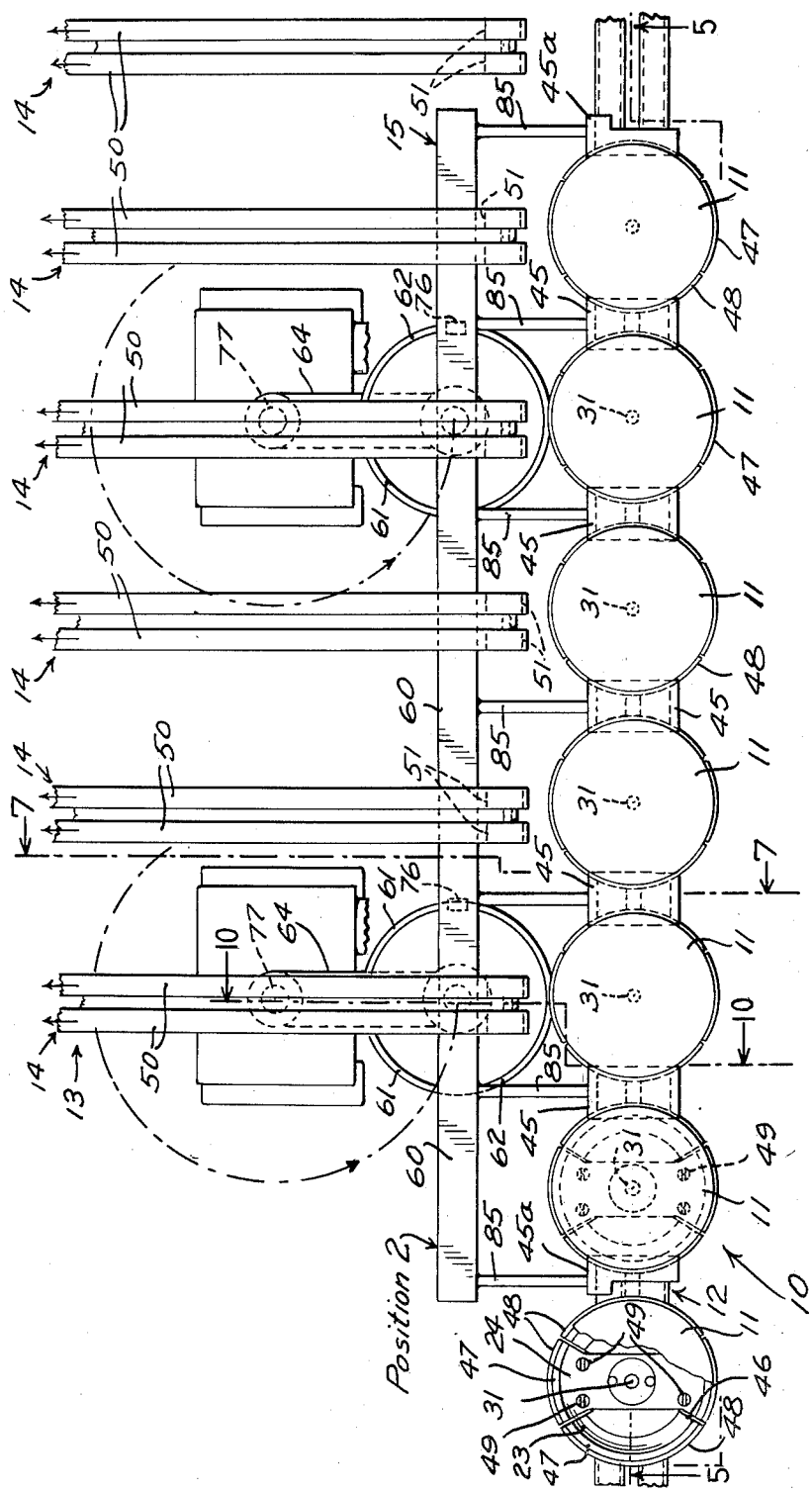
FIG. 2 is a top plan view of the transfer mechanism similar to that shown in FIG. 1 but at a later stage, while the objects are being picked up from one conveyor in single file for transfer to the other conveyor in rank formation.
Figure 10:
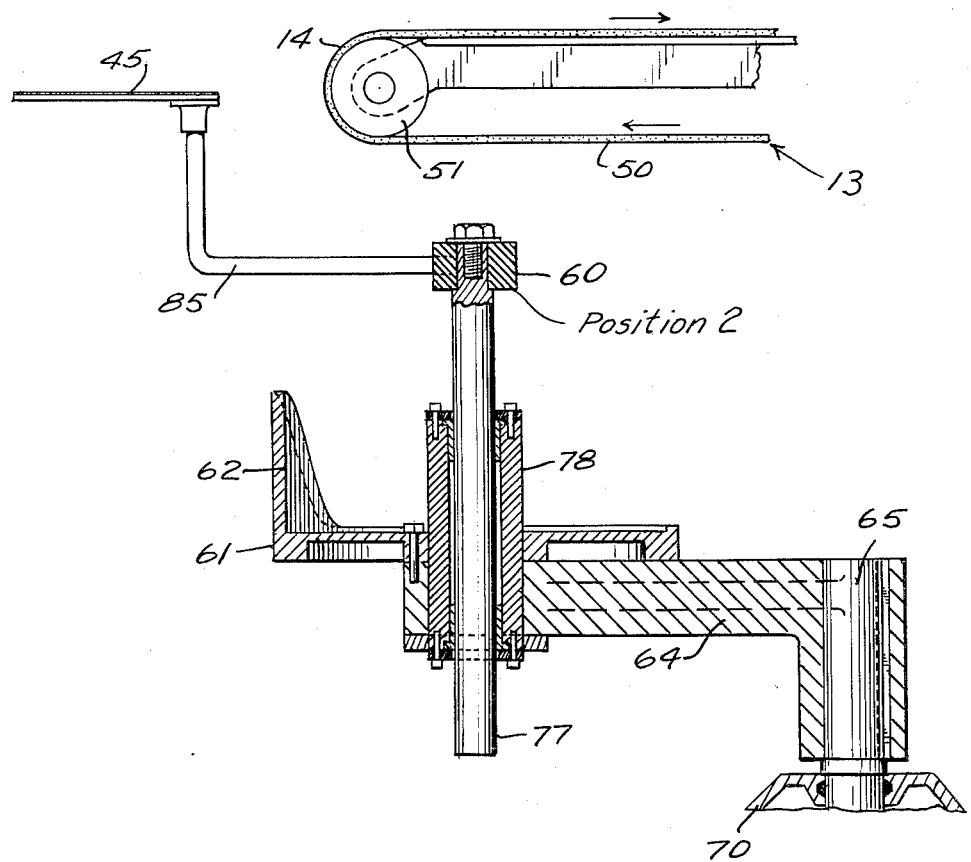

FIG. 9 is a section of the transfer mechanism similar to that shown in FIG. 8 but illustrating the mechanism at a stage subsequent to that shown in FIG. 8, after the file of objects from one conveyor has been deposited as a rank on the other conveyor and after the mechanism is moving into position to pick up the next file of objects; and FIG. 10 is a section of the transfer mechanism taken on lines 10—10 of FIG. 2 but on a larger scale.

Referring to the drawings, there is shown an endless conveyor 10 by which objects 11 illustrated in the form of conveyors or pails are moved in single file. These containers or pails 11 may be either of the closed top type, adapted to be filled through a hole in the cover or may be of the open top type. Also, these containers may be moving in upright position, in which case no turnover operation for the purpose described may be required or may be of the open top type, coated internally with thermoplastic material and supported in inverted position with their open tops on the bottom, in which case, after being externally coated, the containers may be subjected to turnover operations before being carried through the drying oven (not shown).

The conveyor 10 in a specific embodiment carries objects 11 thereon in single file through the field of action of a spraying mechanism (not shown) where the outsides of the containers are coated. These objects 11 are shown in the form of cylindrical containers.

The conveyor 10 has a substantially straight transfer run 12 passing in front of a conveyor system 13 having a plurality of parallel runs 14, six being shown, extending at right angles to the direction of the conveyor run 12. A transfer mechanism 15 cyclically picks up a plurality of containers 11 in single file on the conveyor run 12 corresponding in number to the number of conveyor runs 14 and transfers them to the latter runs respectively for movement thereon in the form of successive ranks or rows. The conveyor system 13 leads towards a turnover mechanism (not shown), which may be rendered inoperative where turnover operations are not required, and towards a drying oven (not shown) beyond said turnover mechanism. The two conveyor systems 10 and 13 are operated continuously, while the transfer mechanism 15 is operated cyclically to effect periodically the transfer operations described.

The conveyor 10 is shown comprising a series of blocks 17 (FIGS. 3, 6 and 7), which are slidable over a pair of tracks 18 secured to frame uprights 20 affixed to the floor and which are interconnected by a series of sprocket chains 21 to form with said chains an endless belt. This endless belt 17, 21 passes over and is driven by sprockets (not shown) having recesses at intervals around their circumferences to receive these slide blocks 17 respectively as the belt is driven thereby.

Secured to each block 17 is an upstanding post 22, carrying a stand 23. Cooperating with each stand 23 is a seat 24 on which a container 11 is supported. Each seat 24 rests on the corresponding stand 23 and nests therein during certain phases of its movement along the course of the conveyor 10 but rises as the containers 11 are brought across the end of the conveyor system 13 to permit a pair of lifting platforms 45 or 45a forming part of the transfer mechanism 15 to extend underneath the seat to lift the container therefrom for transfer operations. To effect this periodic lifting operation of the seat 24, the post 22 carrying the stand 23 is in the form of a sleeve, and this stand has a hole in registry with the hollow of said post. Passing through each post 22 and through the hole of the stand is a rod 31 carrying at its upper end the seat 24, and carrying at its lower end a wheel truck 32 (FIGS. 3, 6 and 7) riding on a pair of tracks 33 which is secured to the upright frames 20 and which extends along the transfer run section 12 of the conveyor 10.

In the part of the conveyor 10 beyond its transfer run 12, the seat 24 with the container 11 thereon is resting on the stand 23, and this seat is supported by the support of the stand. Along the conveyor transfer run 12, however, while the seat 24 is being lifted from the stand 23, the seat is supported independently of the stand. To lift the seat 24 as it moves along the conveyor transfer run 12 and to support it independently of the stand 23 as said stand remains at the same elevation, there are provided along said conveyor run and below the tracks 18 the tracks 33 extending substantially horizontally. At the entry end of these tracks 33 are respective upwardly inclined tracks 35 (FIG. 3) merging in said tracks 33 respectively.

As each seat 24 with a container 11 thereon approaches the conveyor transfer run 12 across the end of the conveyor system 13, the seat is resting on the corresponding stand 23, the corresponding block 17 is riding on the tracks 18 to support the seat and stand together, and the wheel truck 32 at the lower end of the seat rod 31 is idle. As the seat 24 reaches the region over the inclined tracks 35, the truck 32 starts to ride along said tracks and to raise thereby the seat, while the stand 23 remains at the same level, until the truck reaches the horizontal tracks 33, whereupon the seat remains in constant elevated position until the seat reaches the end of the conveyor transfer run 12.

The tracks 18 supporting the blocks 17 along the conveyor run 12 are also substantially horizontal but at the exit end of said run, the containers 11 have already been moved from the corresponding seat 24 and it is necessary to move the empty seat with its corresponding stand 23 into position to receive a fresh supply of containers 11 from a conveyor (not shown) or from other loading source in succession for movement through the field of action of the spraying mechanism. For that purpose, the empty seat 24 and the stand 23 as they leave the conveyor transfer run 12 are gradually lowered into loading position, and the horizontal tracks 18 beyond said run connect into downwardly inclined tracks (not shown). To effect smooth transition of the support for the stand 23 from the tracks 18 to these downwardly inclined tracks, each block 17 carries a wheel truck 36 (FIGS. 3, 6 and 7) adapted to ride downwardly along said inclined tracks to cause the stand to ride downwardly in a direction parallel to these inclined tracks. Downwardly inclined tracks (not shown) for the trucks 32, connected to the tracks 33 respectively at their exit ends cause the empty seats 24 to move downwardly along said inclined tracks with their corresponding stands 23. Eventually, the seats 24 and stands 23 are brought together and proceed with containers 11 deposited thereon towards the field of action of the spraying mechanism (not shown) and then towards the transfer mechanism 15.

The part of the conveyor 10 beyond its transfer run 12 across the end of the conveyor system 13, forms, per se, no part of the present invention and has been described only briefly, to make apparent the purpose of certain structures shown in the drawings in connection with the conveyor 10. Also, in this connection, it is noted that each post 22 carries a pinion 37 (FIGS. 3, 6 and 7) for the purpose of turning the seat 24 and the corresponding stand 23, as they move past the field of operation of the spraying mechanism (not shown), to turn the container 11 supported thereon as it is sprayed, and thereby to assure full spray coverage of the container. To lock the seat 24 and stand 23 together for this turning operation during the spraying operation, the seat has a dowel pin 38 adapted to pass through either one of a pair of diametrically arranged holes in the stand. To assure against turning of the seat 24 relative to the stand 23 while the seat is lifting from the stand on the conveyor transfer run 12, a pin 40 extending through the corresponding block 17 with a slide fit rigidly connects at its lower end to the truck 32 to which the seat is connected through the rod 31. This prevents the truck 32 from swaying as it rides along the tracks 33 and since the block 17 is held against swaying by the tracks 18, the stand 23 and the seat 24 are held against rotative swaying, even though said stand and said seat are separated.

Figure 1:
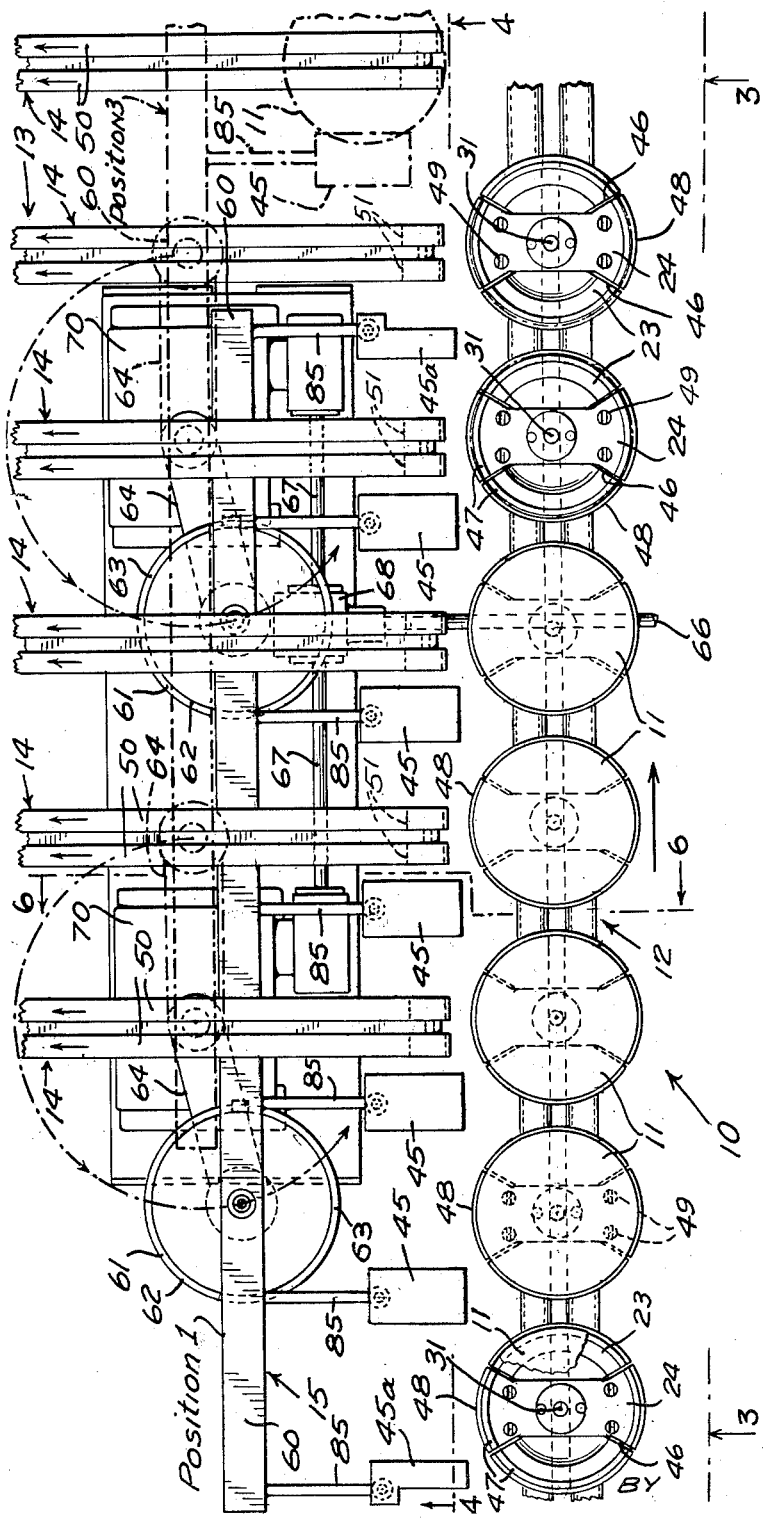

The outline of each stand 23 is in the form of a circle and each seat 24 is substantially in the form of a center segment of this circle as shown in FIGS. 1 and 2 to expose opposite container supportable sections 44 of the lower ends of the seated container 11 beyond the sides of said seat to permit lifting platforms 45 and 45a which form part of the transfer mechanism 15, to be moved against said exposed sections respectively to lift the containers from the seat while elevated. To nest the seat 24 into the stand 23, so that the seat and stand form a composite unit 23, 24 on which the container 11 will be supported when the seat is in lowered position, the stand has a recess 46 therein conforming with the segmental shape of the seat to receive snugly the seat in its lowered position. The seat 24 and stand 23 conjointly have a circular rim 47 near their periphery set radially inwardly from and concentric with the outer peripheral edge 48 of the composite unit 23, 24, and adapted to extend snugly upwardly into the cylindrical wall of the container 11 to center the container on the composite unit and to hold it in center position when the container is carried by said unit. When the seat 24 is raised from the stand 23, the portion of the rim 47 on said seat still extends into the cylindrical wall of the container 11 and still holds and centers the container on said seat until said container has been transferred.

Permanent magnets 49 on the seat 24 serve to hold the container 11 against possible displacement therefrom, when the container has a wall across its lower end which the magnets can attractively engage, as for example, when the container is of the closed top type. Where the container 11 is open at the top and inverted, the telescoping of the container over the part of the rim 47 on the seat 24 holds the container to the seat until transfer is effected, without the use of the magnets 49.

The conveyor system 13, as previously described, comprises a plurality of parallel runs 14 corresponding in number to the number of containers to be supported on said system in successive rows. In the specific form shown, there are six conveyor runs 14 on the same level to accommodate respectively thereacross six containers 11 side by side and to convey the containers in this rank formation. Each conveyor run 14 is shown comprising a pair of conveyor belts 50 supported on pulleys 51. All of the conveyor runs 14 are operated at the same speed through a single drive in synchronism with the drive of the conveyor 10 in any suitable manner.

The transfer mechanism 15 is operated by the combination of a linkage system and a cam and comprises a transfer beam 60 extending horizontally and parallel to the line of containers 11 along the conveyor transfer run. This beam 60 carries the container lifting platforms 45 and 45a and is supported on a pair of cams 61 to move and actuate said platforms through successive container transfer operations. Each cam 61 has a cylindrical wall 62 varying in height to define the required cam contour on its edge 63 and is supported for rotation about a vertical axis spaced from the cam. In the specific form shown, each cam 61 is rigidly secured at its center to one end of a horizontal arm 64, the other end being keyed or otherwise secured to a vertical shaft 65. The two arms 64 are parallel to form a parallel motion mechanism with the transfer beam 60 in a manner to be further described.

The two shafts 65 are driven in unison at the same speed and for that purpose, an input shaft 66 from a motor (not shown) drives two shafts 67 through a suitable gear reduction transmission 68 and these shafts 67 in turn drive the shafts 65 through suitable further gear reductions 70. The rotation of the two shafts 65 in unison rotate the parallel arms 64 and cause the cams 62 to swing in unison about the axes of these shafts respectively.

The transfer beam 60 is supported on the cam edges 63 so that the rotation of the cams 61 about the axes of the shafts 65 respectively, moves the beam for transfer operation. To support the beam 60 on these cam edges 63, the beam has rigidly secured to the underside thereof two cam roller brackets 75, each carrying a roller 76 on its lower end resting on the corresponding cam edge 63 in cam follower relationship thereto. A pair of vertical guide rods 77 rigidly secured to the transfer beam 60 at spaced sections pass through respective guide sleeves 78 secured to the centers of the cams 61 respectively and are embraced by the parallel arms 64 at one end, so that these parallel arms have pivotal connections with the transfer beam and form therewith the parallel motion mechanism described.

The lifting platforms 45 and 45a are horizontal and are rigidly secured to the transfer beam 60 at equally spaced sections thereof by a corresponding series of L-shaped rods 85 extending from the forward longitudinal edge of said beam. There are two platforms 45a shown at opposite ends of the transfer beam 60, these being narrower than the platforms 45 to engage only the outer exposed side sections 44 of the lower ends of the outside containers of each bank of six containers 11 on the conveyor transfer run 12 and the other platforms 45 are spaced between said platforms 45a and each is wide enough to engage the outer exposed side sections 44 of adjoining containers in said bank. Since the seat 24 directly ahead of the bank of six containers is empty, the platform at the right hand end of the series (FIG. 1) need not be as shown but can be of the wider type similar to the platform 45.

In the operation of the machine, the containers 11 are moved continuously in single file by the conveyor 10 and past the front end of the conveyor system 13 by the conveyor run 12. As the containers 11 are moved into position in front of the conveyor system 13, the seats 24 riding on the tracks 35 and 33 through the wheel trucks 32, are raised above the stands 23, and the containers are thereby raised above and clear of said stands. At the same time, the vertical shafts 65 are continuously rotating and these cause the parallel arms 64 to rotate. The rotation of these arms 64 causes the transfer beam 60 to be translated continuously in positions parallel to each other. The rotation of the vertical shafts 65 and the movement of the conveyor 10 are synchronized to effect the transfer of predetermined banks of containers 11 in single file onto the conveyor system 13 in rank formation without interrupting the continuous operation of said conveyor and said conveyor system. The different phases of operation of the transfer mechanism 15 are illustrated in the drawings.

Figure 3:
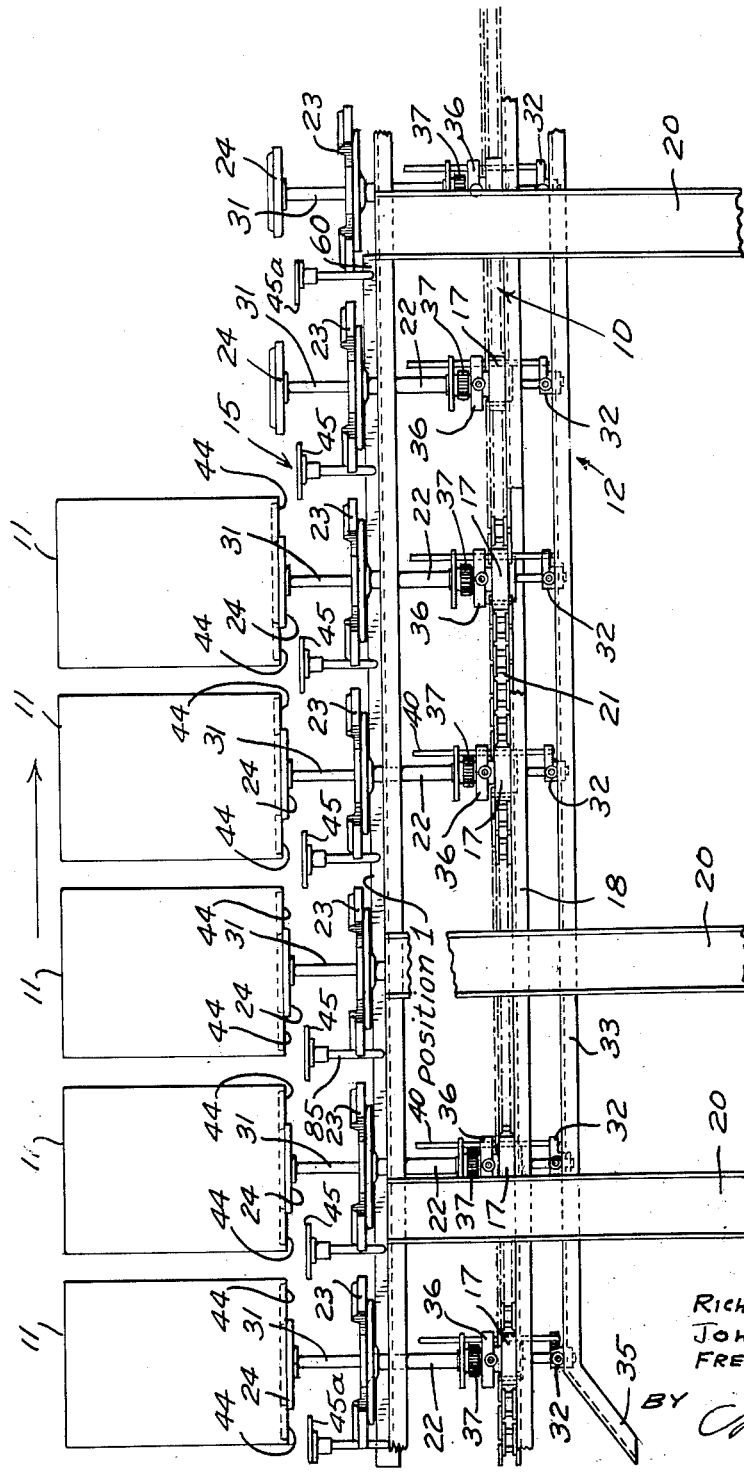
FIG. 3 is a side elevational view of the transfer mechanism taken approximately along the lines 3—3 of FIG. 1 and shown at the same initial stage.
Figure 6:
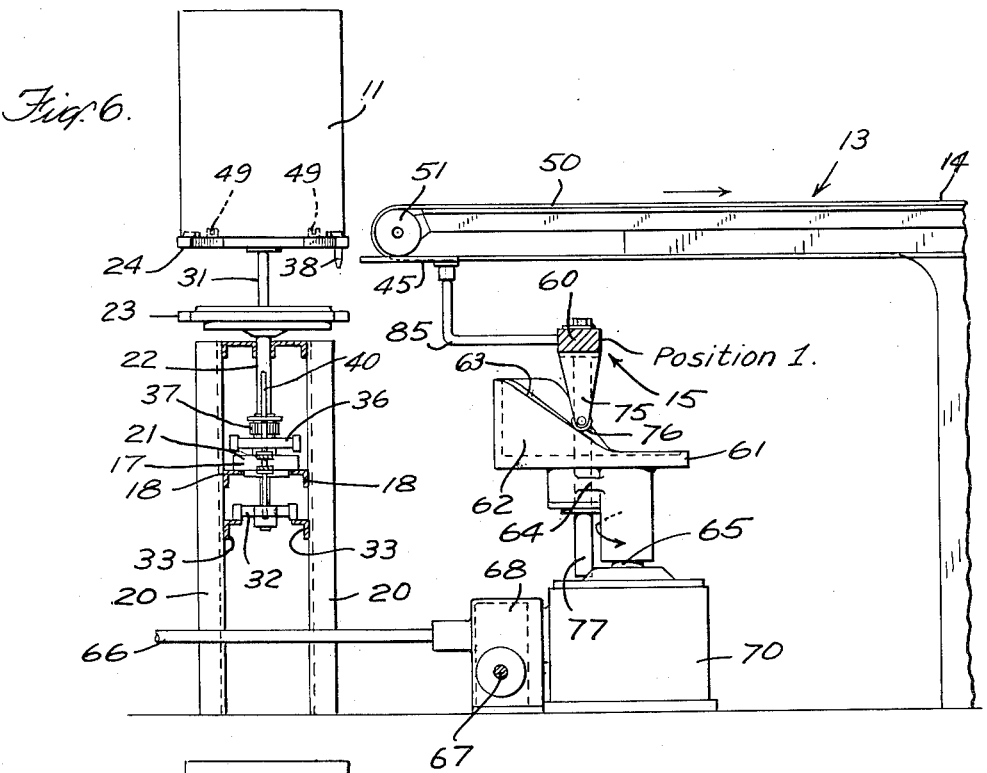
FIG. 6 is a section of the transfer mechanism taken on lines 6—6 of FIG. 1 and showing the mechanism at the same initial stage.
Figure 7:
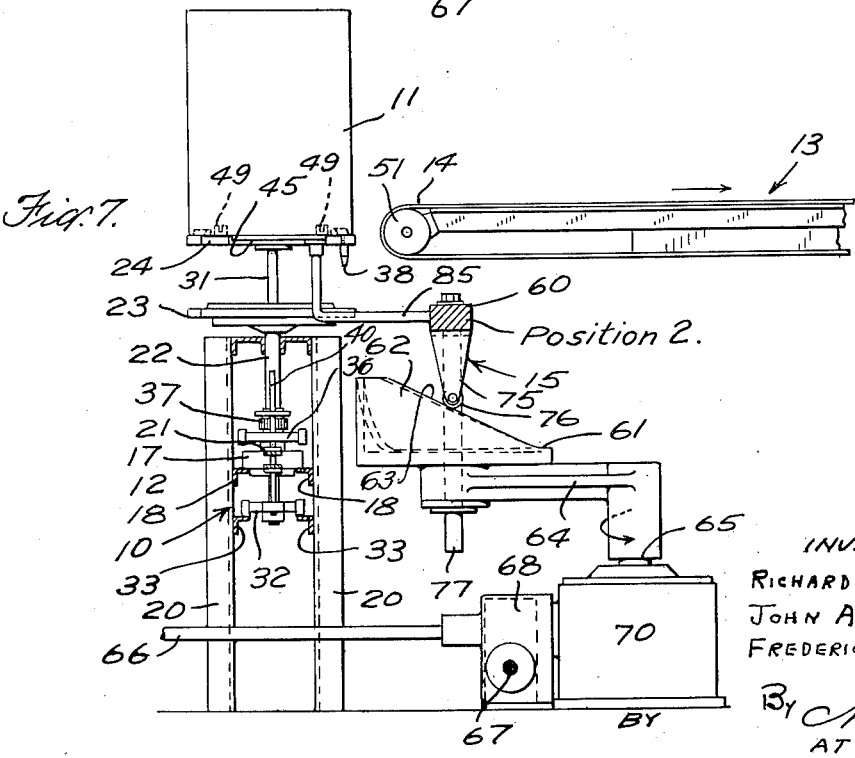
FIG. 7 is a section of the transfer mechanism taken on lines 7—7 of FIG. 2 and showing the mechanism at the same later stage.

FIG. 1 shows the transfer mechanism 15 in full lines in position referred to as "position 1." FIGS. 3, 4 and 6 show in full lines the transfer mechanism 15 in the same position. In this position 1, the platforms 45 and 45a are below the level of the elevated seats 24 supporting the containers 11 and the cams 61 are near their extreme left hand shown in full lines in FIG. 1. As the arms 64 swing counter-clockwise (FIG. 1) about the axes of the shafts 65, from the position indicated in full lines, the transfer beam 60 is translated forwardly towards the file of containers 11 on the conveyor run 12. When the arms 64 have moved into position in which the cams 61 are in position closest to the file of containers 11 on the conveyor run 12 as shown in FIG. 2, the transfer beam 60 will be in forwardmost position, and the platforms 45 and 45a will also be in their forwardmost position indicated as "position 2" in FIGS. 2, 5 and 7.

In position 2, the platforms 45 and 45a will be in engagement with the undersides of the exposed side sections 44 of the six containers 11 beyond the sides of the elevated seats 24, these platforms having been moved not only forwardly into this position from position 1 but also having been raised by the cams 61 from position 1 below the levels of the seats 24 to positions in contact with the undersides of the containers. During this phase of the transfer operation, the cam rollers 76 are riding on the rising part of the cam edges 63.

As the arms 64 continue their counterclockwise swing (FIG. 1) from position 2 shown in FIG. 2, the platforms 45 and 45a through the action of the cams 61 continue to rise and lift the six containers 11 from their seats 24 in unison without disturbing their relative positions. The rotation of the arms 64 from position 2, moves the transfer beam 60 rearwardly and towards the right (FIG. 1) until they reach "position 3" indicated in FIG. 8 and in dot and dash lines in FIG. 1, in which the cams 61 are near their extreme right hand positions (FIG. 1) and the containers 11 are directly above the respective conveyor runs 14 centrally thereof.

The platforms 45 and 45a and their supporting rods 85 are arranged to move in and out between the conveyor runs 14 without interfering with these runs, and the spacing between the centers of the containers 11 corresponding to the spacing between the centers of the stands 23 and seats 24, is the same as the spacing between the centers of the conveyor runs, so that the containers carried by the platform 45 and 45a without relative displacement, will land in position 3 shown in dot and dash lines in FIG. 1 and in full lines in FIG. 8 in centered positions over the conveyor runs 14 respectively. At that instant, the rollers 76 riding on the high uniform sides of the cams 61 will have reached the ends of said high sides, as shown in FIG. 8. The parts of the cams 61 beyond these high sides of uniform level, slope steeply downwardly, so that further movement of the arms 64 counter-clockwise (FIG. 1) will cause the platforms 45 and 45a to move quickly downwardly to deposit the containers 11 centrally upon the conveyor runs 14 respectively, as shown in "position 4" in FIG. 9. The containers 11 deposited on the conveyor runs 14 will be aligned in a row of six and will be moved together in rank formation towards a turnover device, if such is in operation, or towards a drying oven, or towards some other station for further processing or operation. The transfer mechanism 15 continuing its operation from position 4 shown in FIG. 9, will return into position shown in full lines in FIG. 1 to complete its cycle, while the next bank of six containers is moving along the conveyor run 12 into position to be transferred during the next cycle of operation of the transfer mechanism.

While the invention has been described with particular reference to a specific embodiment, it is to be understood that it is not to be limited thereto, but is to be construed broadly and restricted solely by the scope of the appended claims.

What is claimed is:

1. An apparatus for transporting objects comprising a conveyor for moving the objects in single file, a conveyor system for moving the objects in successive ranks, and means for cyclically transferring successive banks of said objects in file from said conveyor to said conveyor system for movement by said conveyor system in rank formation, said transferring means comprising a plurality of platforms, means for moving said platforms in unison through each cycle from a position near the conveyor to a position near the conveyor system to carry the objects from said conveyor to said conveyor system, and cam means for simultaneously moving the platforms up and down during each cycle, to cause the platforms when near the conveyor to move upwardly from below the objects to lift the objects from the conveyor, and to cause the platforms when near the conveyor system to descend from above the conveyor system to deposit the objects onto said conveyor system in rank formation.

2. An apparatus for transporting containers of circular periphery comprising a conveyor for moving the containers and including a substantially circular stand for each container, a seat on said stand for each container normally nested into said stand and shaped in the form of a center segment of the peripheral circle of said stand to cause opposite container supportable sections of the seating end of the container to extend outwardly beyond the sides of the seat, a conveyor system, said conveyor having a run passing in the vicinity of said conveyor system, and means for raising the seat on each stand as the stand approaches said run for raising the container on the latter stand away from the latter stand to expose said container supportable sections of the latter container, plaform means operable cyclically to engage the exposed container supportable sections of each raised container on said run, lift the latter container thereby from its seat and transfer the lifted container onto the conveyor system, said conveyor being adapted to support and convey the containers in single file, said conveyor system being adapted to support and convey the containers in rank formation, said platform means being operable to transfer successive banks of containers as they move into said run in single file to said conveyor system as successive ranks.

3. An apparatus for transporting objects, comprising a conveyor for moving the objects in single file, a conveyor system for moving the objects in successive ranks, a transfer beam, platforms secured to said transfer beam for movement therewith, a parallel motion mechanism for cyclically moving said beam to cause said platforms to move in unison through each cycle from a position near the conveyor to a position near the conveyor system to carry the objects from said conveyor to said conveyor system, and cam means for simultaneously moving the transfer beam up and down during each cycle to cause the platforms when near the conveyor to move upwardly from below the objects to lift the objects from the conveyor, and to cause the platforms when near the conveyor system to deposit the objects onto said conveyor system in rank formation.

4. An apparatus for transporting objects as described in claim 3, wherein said parallel motion mechanism comprises a substantially horizontal transfer beam, a pair of parallel arms having respective fixed axes at one end, means for driving said arms in unison about said axes respectively, and pivotal connections between the other ends of said arms and said transfer beam, permitting said beam to move up and down in relation to said arms, and wherein said cam means comprises two similar circular cams secured to said arms at said other ends respectively for movement with said arms about said axes respectively, and each presenting a cam surface, and cam follower means supporting said transfer beam on said cam surfaces causing said transfer beam to move cyclically up and down.

5. An apparatus for transporting objects, comprising a conveyor for moving the objects in single file, a conveyor system for moving the objects in successive ranks, a line of platforms corresponding in number to the number of objects in each of a series of successive banks on said conveyor plus one, and means for moving said platforms cyclically in unison (1) to cause each platform except the end platforms in said line into position to engage the adjoining underside sections of a corresponding pair of adjoining objects in a bank and the outside platforms into positions to engage the outer underside sections of the end objects respectively in said bank, (2) to cause the platforms so positioned to rise and thereby to lift the objects in said bank from said conveyor and (3) to transfer the lifted objects in said bank to said conveyor system and deposit the latter objects onto said conveyor system in rank formation.

6. An apparatus for transporting containers for successive operations thereof, comprising a conveyor for carrying the containers in single file and presenting a substantially straight run, a conveyor system comprising a plurality of spaced parallel runs extending laterally from said straight conveyor run and driven in unison, a series of platforms, and means for moving said platform cyclically to cause said platforms to lift a bank of containers from the conveyor, transfer them to the conveyor system and deposit them on said parallel runs respectively for movement therealong in rank formation, said platform moving means comprising means (1) for supporting each container on a pair of spaced platforms while being lifted and transferred to said conveyor system, (2) for moving the platforms with the containers so supported thereon in positions over said parallel runs respectively with the platforms on the sides of said parallel runs and (3) for lowering said platforms while in the latter positions to deposit the supported containers onto said parallel runs respectively.

References Cited in the file of this patent

UNITED STATES PATENTS

| 2,687,205 | Fava | Aug. 24, 1954 |
| 2,781,121 | Brandenberger | Feb. 12, 1957 |

FOREIGN PATENTS

| 585,778 | Great Britain | Feb. 24, 1947 |